United States Patent [19]

Breuss et al.

[11] Patent Number: 5,205,400
[45] Date of Patent: Apr. 27, 1993

[54] TRANSPORTATION DEVICE FOR TRANSPORTATION OF FOODSTUFFS

[75] Inventors: Walter Breuss; Erwin Wolf, both of Heimenkirch, Fed. Rep. of Germany

[73] Assignee: Natec, Reich, Summer GmbH & Co. KG., Opfenbach, Fed. Rep. of Germany

[21] Appl. No.: 775,176

[22] Filed: Oct. 11, 1991

[51] Int. Cl.⁵ .............................................. B65G 15/60
[52] U.S. Cl. .................................. 198/812; 198/816; 198/861.1
[58] Field of Search ............... 198/813, 816, 860.1, 198/861.1, 812

[56] References Cited

U.S. PATENT DOCUMENTS

| | | | |
|---|---|---|---|
| 1,366,944 | 2/1921 | Ritchie, Jr. | 198/861.1 X |
| 1,852,488 | 4/1932 | Stewart et al. | 198/861.1 X |
| 3,456,776 | 7/1969 | Viene | 198/813 |
| 3,474,893 | 10/1969 | Morine | 198/813 X |
| 3,511,358 | 5/1970 | Peterson | 198/813 X |
| 3,695,346 | 10/1972 | Nichols | 198/813 X |
| 3,820,650 | 6/1974 | Garvey | 198/861.1 X |
| 3,993,185 | 11/1976 | Fleckenstein et al. | 198/813 |
| 4,007,827 | 2/1977 | Mattos | 198/813 X |
| 4,846,338 | 7/1989 | Widmer | 198/813 X |
| 5,022,514 | 6/1991 | Lofberg | 198/813 |

FOREIGN PATENT DOCUMENTS

| | | |
|---|---|---|
| 318478 | 10/1974 | Austria . |
| 122573 | 4/1984 | European Pat. Off. . |
| 933621 | 9/1955 | Fed. Rep. of Germany . |
| 1797649 | 7/1959 | Fed. Rep. of Germany . |
| 6941434 | 10/1969 | Fed. Rep. of Germany . |
| 4006474 | 9/1991 | Fed. Rep. of Germany . |
| 2604424 | 4/1988 | France ........................ 198/861.1 |
| 2220905 | 1/1990 | United Kingdom . |

Primary Examiner—D. Glenn Dayoan
Attorney, Agent, or Firm—Brown, Martin, Haller & McClain

[57] ABSTRACT

A transportation device for the transportation of foodstuffs in particular of cut foods consists in essence of a rack in which two rollers are arranged across from one another and over which runs a conveyor belt designed as a continuous belt. The rollers can be rotated on the free ends of end sections readily removable from the rack. This makes it possible to readily exchange the conveyor belt and to modify the length of the transportation device in a simple manner.

8 Claims, 3 Drawing Sheets

TRANSPORTATION DEVICE FOR TRANSPORTATION OF FOODSTUFFS

SUMMARY OF THE INVENTION

The invention concerns a transportation device in which a conveyor belt extends over spaced rollers rotatably mounted at opposite ends of a rack. Such transportation devices are known in the food industry in that on one side of a tube or rod-shaped rack there is a drive unit consisting of a drive motor, a gear and a drive belt, which runs over a drive shaft.

On the opposite side of this conveyor belt is a corresponding roller which rotates within the housing.

A conveyor belt runs over both rollers and is designed as a continuous strand.

Disadvantage of the customary devices is that their lengths cannot be modified.

If for example an installation for cutting one particular food is to be converted for a different application, this may require a change in the length of the conveyor belt. Until now this was not possible without complication.

In addition, the customary transportation devices offer the disadvantage that the belt itself is not readily exchangeable. However, in using such transportation installations in the food industry it is important that the transportation device can be readily cleaned in order to prevent the formation of dirt or germs.

Task of the present invention is therefore to develop a transportation device of the type described earlier so that various transportation lengths can be selected in a simple manner and so that the device is particularly suitable for use in the food industry.

It is an object of this invention to provide a new and improved conveyor belt transportation device.

Essential feature of the invention is that the transportation device is built in a modular fashion so that the end pieces on a rack consisting of profile tubes can be added to or at least lightly loosened from such rack.

One end piece pair supports the guide roller for the conveyor on the one side of the transportation device while the other end piece pair supports the drive unit, whereby at least one end piece can be readily loosened on one side from the profile tube rack.

This offers the essential advantage that in order to change the transportation length the end pieces can now simply be removed, and that the middle section of the transportation device consisting of the individual profile tubes is replaced by other profile tubes of different lengths, after which both end pieces can once again be placed onto this arrangement.

In other words, a transportation device with different transportation length simply requires a corresponding conveyor belt with an appropriate length.

This offers the essential advantage that the belt is readily exchangeable so that it is easily cleaned.

For cleaning the conveyor — preferably on a daily basis — the one end piece pair is simply removed or raised with the guide roller so that the conveyor is free on this side.

In order to be able to remove the conveyor on the drive side from the profile tube rack, at least the one side of the end piece pair against which lies the drive unit can be readily loosened from the tube rack and can be swung up.

This enables one side of the end piece pair to be swung up whereby the transportation belt can be removed through the resulting gap.

This development makes it possible to eliminate the tension of the belt when exchanging the belt in that the end piece pair is swung up with the guide roller whereby it is readily pulled out of the plug connection with the profile tube rack of the middle section.

Overall, the design of a transportation device in accordance with this invention offers the advantage that the transportation length of the transportation device is readily changed so that such an installation can be adapted to various applications, and that the belt can be easily exchanged for the purpose of repair or cleaning.

The following is a more detailed description of the invention through drawings which illustrate only one variant. The drawings and their description disclose additional essential characteristics and advantages of the invention.

DESCRIPTION OF THE PREFERRED EMBODIMENTS

The transportation device in accordance with the invention consists essentially of a profile tube rack 1 composed of round-section tubes whereby individual tube sections 11 are joined together through screw couplings 13 and corresponding tees 12.

It is essential that the screw couplings 13 are sealed so that when the rack 1 is cleaned, for example with a pressure hose, no cleaning liquid reaches the rack 1 and no undesired liquids are formed.

Figure 3:
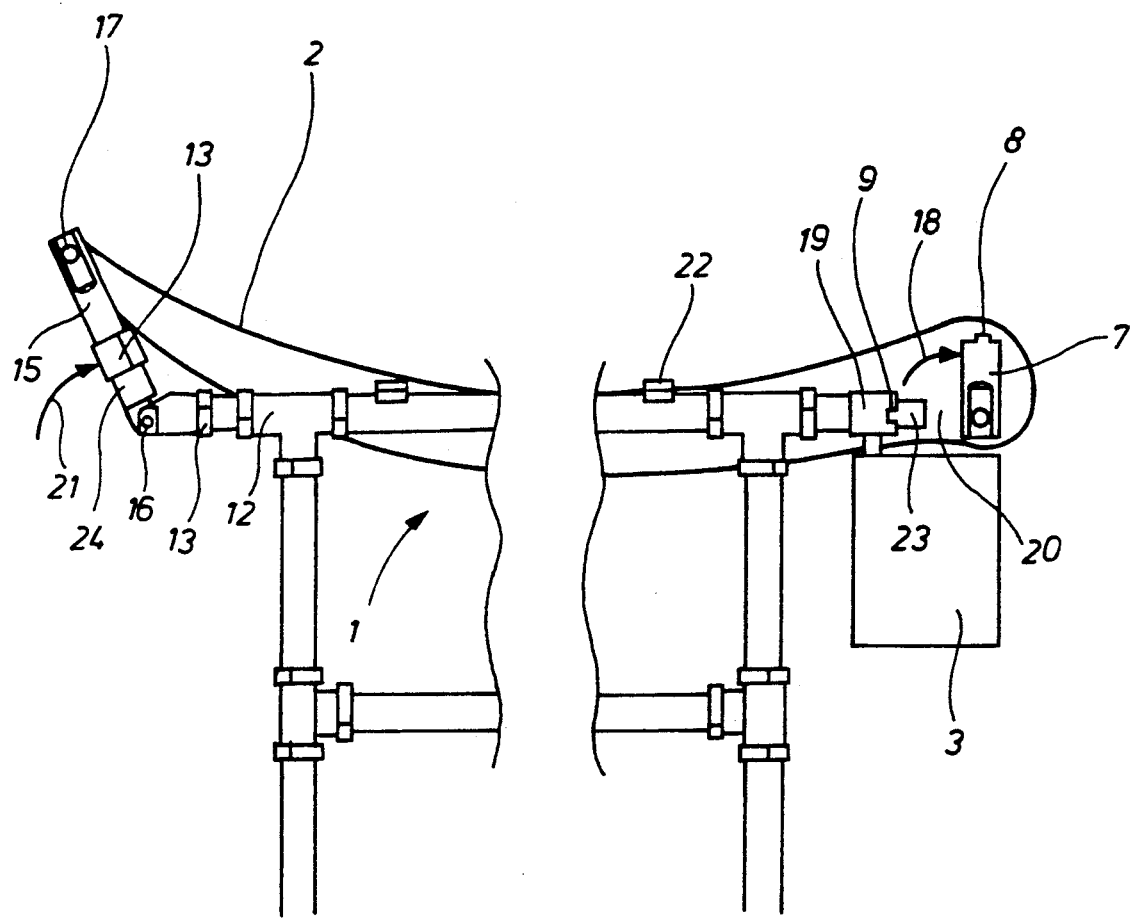
FIG. 3: Lateral view of the transportation device in accordance with FIG. 1 with slack conveyor belt.

The conveyor belt 2 is a continuous belt guided over two rollers 5, 17, whereby the roller 17 can be rotated at the free ends of an end piece pair 14, 15 and whereby each end piece 14, 15 can be swung up within a swivel axis 16 in the direction of arrow 21 (FIG. 3).

This enables the end pieces 14, 15 to be swung up in accordance with FIG. 3 and the conveyor belt 2 to be released, thus facilitating the cleaning of the rack 1.

On the opposite side of the rack is a drive unit 3, consisting essentially of a housing in which the drive motor is housed. Through a drive belt 4 it drives the roller 5 over which runs the conveyor belt 2.

The entire drive unit 3 is also easily removable from the rack 1 in that the entire drive unit 3 is attached to end pieces 6,7.

Figure 2:
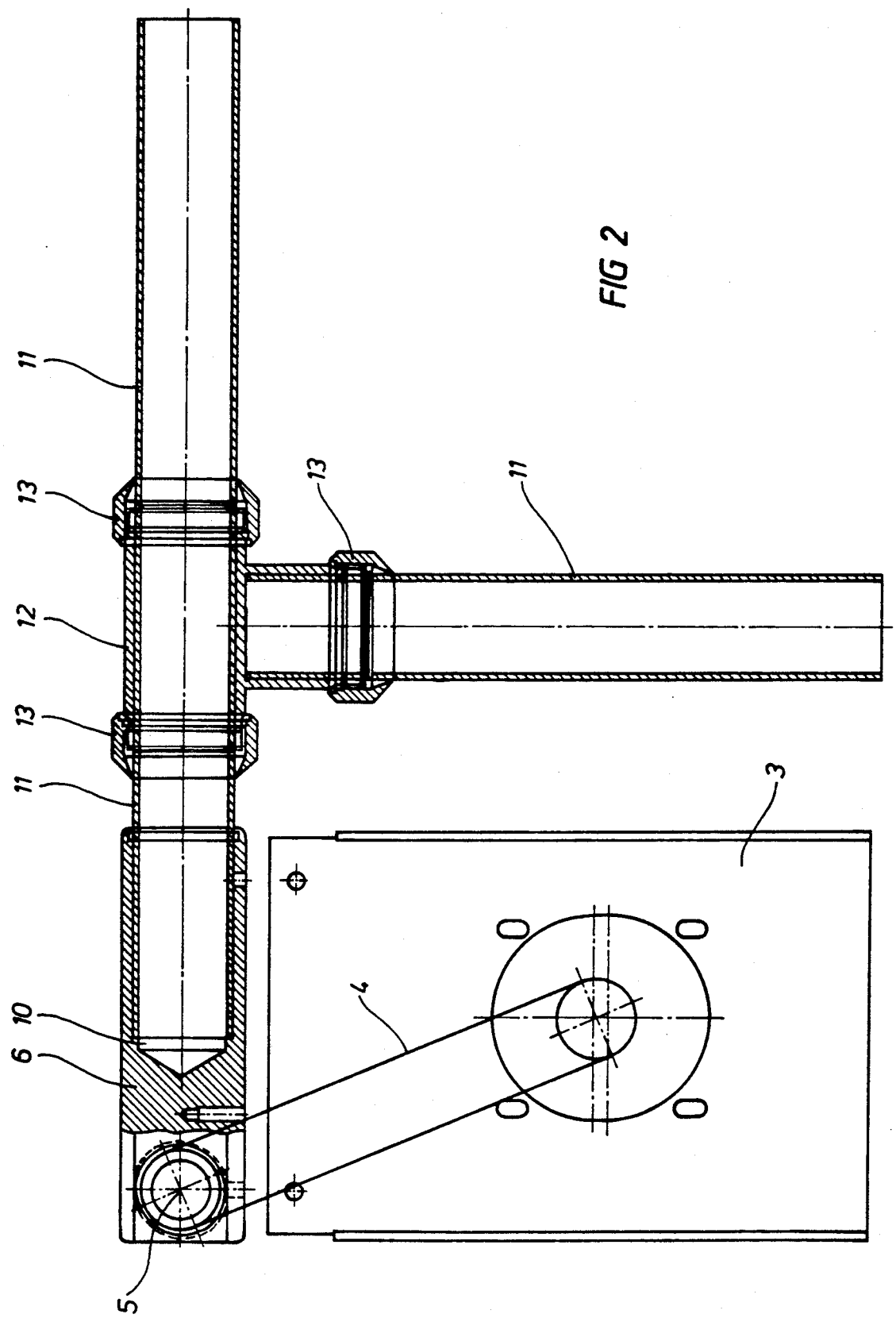
FIG. 2: Top view of the drive side of the transportation device in the direction of arrow II in FIG. 1.

One end piece 6 is designed as a sliding sleeve and features a recess 10 in accordance with FIG. 2 which accommodates the tube section 11 of the rack.

In its joining area to the rack 1 the other end piece 7 can be readily loosened.

It is designed as plug sleeve and features a pin 8 arranged on the one side which engages in a recess 9 in the area of the junction collar 19 of the rack 1.

The junction collar 19 is extended sideways towards the front and forms a collar section 23 (FIG. 3) in order to provide for a lateral guidance of the end piece 7 in the mesh position in the junction collar 19.

The end piece 7 can be rotated in the rotation axis of the roller 5 so that for the purpose of removing the conveyor belt 2 on the drive side 3 the end piece 7 is swung up in the direction of arrow 18 thus resulting in a gap 20 between the junction collar 19 and the raised end piece 7 in accordance with FIG. 3.

If the conveyor belt 2 is to be removed completely from the rack 1, the screw coupling 13 at the end pieces 14, 15 is loosened on the opposite sides so that they can be pulled out of the corresponding junction collars 24, thus making it possible to readily remove the entire transportation belt 2 from the rack 1.

It is important to note that on the drive side the end piece 6 does not need to be loosened because it is sufficient to open the end piece 7 in order to create the gap 20 to bring out the conveyor belt through this gap 20.

This offers a distinct advantage because the relatively heavy drive unit 3 can remain on the rack 1 without the necessity of removing this drive unit 3 with the conveyor belt itself.

The rack 1 also features guideways 22 to guide the conveyor belt 2 in the rack in a straight line.

Figure 1:
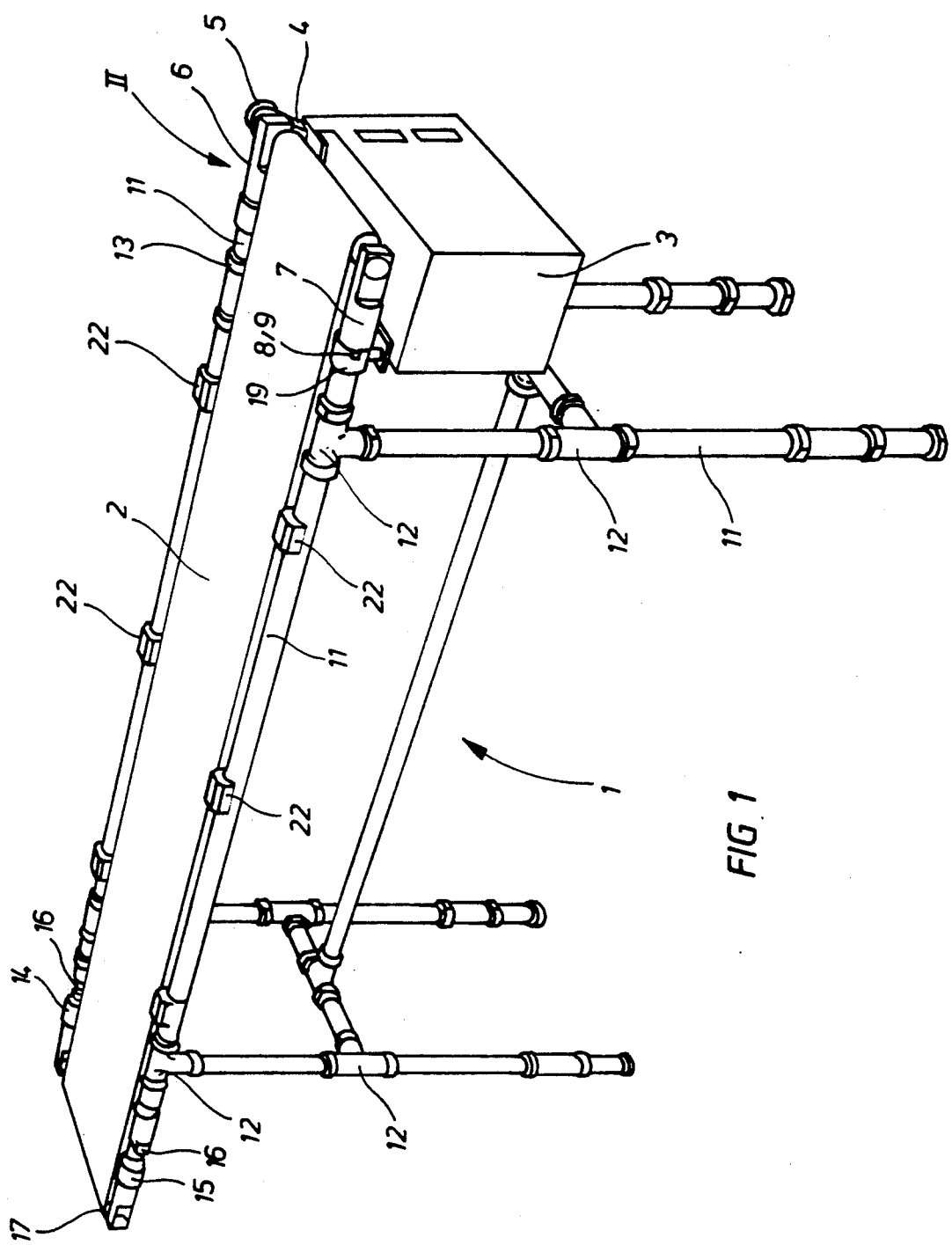
FIG. 1: Perspective lateral view of a transportation device in accordance with the invention.

It is particularly easy to change the transportation length of the transportation device. As described earlier, the conveyor belt 2 is removed from the rack while the tube sections 11 arranged in a horizontal direction are removed by loosening the screw couplings 13 in the area of the tees 12 and replaced by tube sections 11 of a different length. As a result, the length (as well as height) of the rack can be changed at will. A suitable conveyor belt adapted to the new length of the rack is then introduced as shown in FIG. 3 and the rack is closed as shown in FIG. 1 in stand-by position.

It will be understood by those skilled in the field that modifications may be made to the disclosed embodiment without departing from the scope of the invention, which is defined by the appended claims.

We claim:

1. A transportation device for the transportation of items such as foodstuffs, comprising:
    a conveyor frame having a pair of spaced elongate side members extending between opposite ends of the frame;
    a first pair of end supports releasably connected to the ends of respective side members at one end of the frame;
    a second pair of end supports releasably connected to the ends of respective side members at the opposite end of the frame;
    each pair of ends supports having free outer ends;
    a first roller rotatably supported between the free outer ends of the first pair of supports at one end of the frame;
    a second roller rotatably supported between the free ends of the second pair of supports at the opposite end of the frame;
    the first roller comprising a driven roller;
    one of said first pair of supports comprising means for swinging up at one end away from said frame; and
    a continuous conveyor belt extending over said rollers.

2. The transportation device as claimed in claim 1, including:
    releasable connector means for releasably connecting both end supports of one pair of end supports and at least one end support of the other pair of end supports to the frame, whereby the end supports can be readily removed from the frame.

3. The device as claimed in claim 1, including hinge means for pivotally securing the second pair of end supports to the frame to allow the second pair of end supports to be swung up at an angle to the frame.

4. The device as claimed in claim 3, including releasable connector means spaced from said hinge means for releasably securing said second pair of end supports to said frame.

5. The device as claimed in claim 1, wherein the other support of said first pair of supports comprises an at least partially tubular sleeve member for telescopic sliding engagement with the outer end of the corresponding side of the frame.

6. The device as claimed in claim 1, wherein the frame comprises a plurality of tube sections and screw coupling devices for releasably securing the tube sections together.

7. The device as claimed in claim 6, wherein the screw coupling devices are sealed.

8. The device as claimed in claim 6, wherein each side member comprises a plurality of aligned tubular members, and a plurality of vertical support members extending transversely at spaced intervals from said longitudinal side members to support them in a horizontal plane, the vertical support members each comprising a plurality of tubular members, and a plurality of T-shaped tubular sections for connecting each pair of aligned tubular members to a transversely projecting tubular member at the junction between the aligned members, and screw couplings for releasably connecting the adjacent ends of each pair of members together.

* * * * *